No. 879,352.
PATENTED FEB. 18, 1908.
E. P. ARMSTRONG.
SAW SWAGE.
APPLICATION FILED JULY 18, 1904.
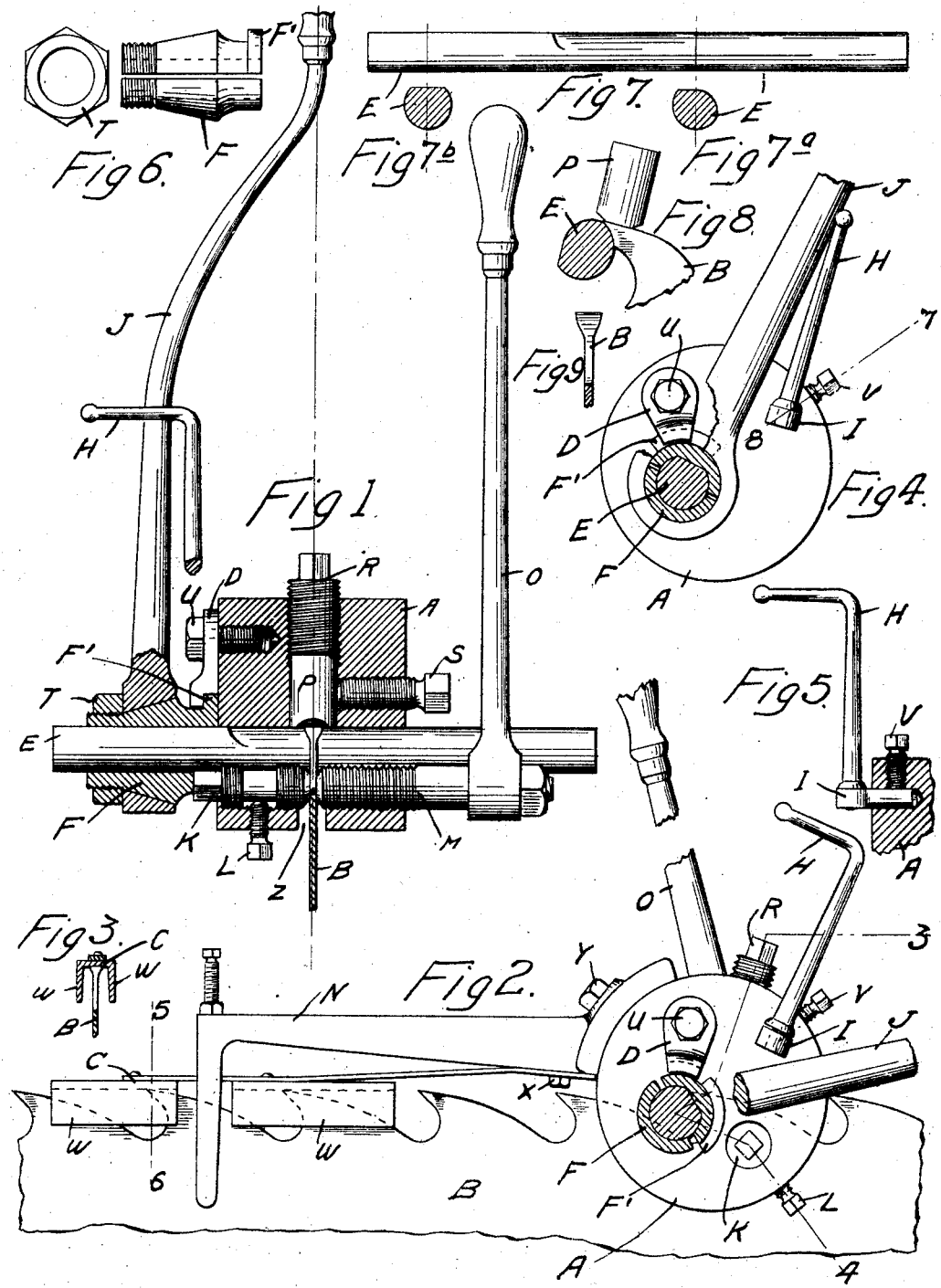
WITNESSES
INVENTOR
EDWARD P. ARMSTRONG
BY
HIS ATTORNEYS

UNITED STATES PATENT OFFICE.

EDWARD PICKERING ARMSTRONG, OF PORTLAND, OREGON.

SAW-SWAGE.

No. 879,352.  Specification of Letters Patent.  Patented Feb. 18, 1908.

Application filed July 18, 1904. Serial No. 217,146.

*To all whom it may concern:*

Be it known that I, EDWARD PICKERING ARMSTRONG, a citizen of the United States, residing at Portland, in the county of Multnomah and State of Oregon, have invented a new and useful Saw-Swage, of which the following is the specification.

My invention relates to improvements in saw-swages in which a fixed anvil is held against one side of the saw tooth and a rotatory eccentric swaging die acts on the opposite side of the tooth, the movements of said eccentric die causing the space between it and the said anvil to close up or open out, the anvil being placed on its side of the tooth and slipped back until the tooth rests against said die while standing open.

The swage is clamped against the saw by setting up clamping screws on the opposite sides of the saw. Upon rotating the swaging die pressure is brought to bear against the saw tooth forcing it against the opposing anvil and thus spreading or widening out the tooth point. And the object of my invention is, first, to provide a saw-swage better adapted to its use than heretofore, by supplying it with a means permitting the removal of the eccentric die from its working hole in the swage block or body at will, and replacing it again to working position, and securely locking it there without the use of tools or removing any of its parts. Second, to provide a means for locking the adjustable clamp screw without the use of a check nut, thus enabling the clamp screw to be placed closer to the eccentric die, making it clamp the saw tooth nearer the point being swaged, and reducing the liability of it being bent sidewise while being swaged. Third, to provide an eccentric die shaped for a portion of its length at one end to adapt it to be secured to the operating handle, and permit of a long range of adjustment endwise, and shaped the balance of its length to an eccentric form and adapted to be removed from and replaced in its working hole without interfering with the anvil, although said anvil may be projecting into the working hole of said die, as it must when in use. Fourth, to provide an operating handle for the eccentric die that is bent or curved to bring the hand hold part directly over and in line with the saw to be swaged, whereby the pressure applied to said handle by the operator in swaging the saw, is exerted in the vertical plane of the saw and thereby danger of bending the teeth by side strain which frequently occurs with a straight handle, is avoided. Fifth, to provide a rider or guide adapted to rest on top of the saw teeth in advance of the swage to hold it in the position desired on the saw, said rider or guide having flanges on its side to project down past the points of the saw teeth on both sides, to prevent said rider or guide from slipping off the teeth when the swage is being moved from one tooth to another. I attain these objects by the mechanism illustrated in the accompanying drawing, in which similar letters refer to similar parts throughout the several views.

Figure 1 is a section of the swage and saw on line 3,—4, in Fig. 2 looking from the right. Fig. 2 is a side view of the swage in position on saw B. Fig. 3 is a section of rider or guide C on dotted line 5,—6, of Fig. 2 looking from the left. Fig. 4 is a side view of the swage with the guide arm N removed, showing handle J and stop H in position for use with the die lock F in working position behind the locking clasp D. Fig. 5 illustrates the stop H and its base I, in position in block A, block A being shown in section on dotted lines 7,—8 in Fig. 4 looking from the right. Fig. 6 illustrates a tapered bush or sleeve and binding nut, which forms the grip to secure die E, and handle J, together, also having locking flange F formed upon it to engage locking clasp D, (see Fig. 1). Fig. 7 illustrates the die E showing its shape, the eccentric working part being shown by section 9 and the part to receive the operating handle being shown in section 10. Figs. 7ª and 7ᵇ are transverse sectional views of the die showing its shape at different points in its length. Fig. 8 illustrates the anvil P in position on the back of saw tooth B, said tooth having just been swaged against anvil P by die E, this view being further understood by referring to Fig. 1, and noting the relative position of saw B, die E and anvil P. Fig. 8 being a view of these looking from the left. Fig. 9 illustrates a saw tooth point after being swaged, if viewed from the left in Fig. 8.

In the drawings, A represents the swage block or main portion of the device whereon the other operating parts are mounted.

P is the anvil capable of vertical adjustment and held in place by screws R and S (see Fig. 1).

M and K are the swage clamping screws threaded into the block A and adapted to engage the surfaces of the saw. A guide arm N is secured to the block A by a screw Y, and a rider C is secured to the arm N by any suitable means, as screw X. A regulating stop H is held in place on the block A by screw V and is adapted to be set at any desired point to regulate the throw of handle J for the purpose of controlling the movement of the die E and causing it to swage light or heavy. A locking clasp D is secured to the block A by screw U. It is desirable in a tool of this kind to provide means for the removal of the die E from its working position without the necessity of changing any of the adjustments of the swage and to provide means for locking the die in its working position to prevent it from sliding endwise out of place when the tool is in use. It is also desirable to make this change from a locked to an unlocked position and vice versa, without detaching any of the parts of the swage except of course, the releasing of the die E and its operating handle J from the block A. I accomplish this by turning the stop H to the right then turning the handle J in the same direction until the flange F is disengaged from the clasp D. The die E can then be readily removed by withdrawing it from its bearings. In the same manner it can be inserted in its working position. When the die has been returned to its working position the stop H is reset to limit the movement of the operating handle J.

As shown in Fig. 5, I prefer to mount the stop H in a stud I that fits into a socket in the swage block and is locked therein by the screw V. By loosening the screw the stud and stop may be adjusted to vary the stroke of the operating handle or the stop may be swung around out of the path of the handle without moving the stud.

In Fig. 6 I have illustrated a tapering bushing or sleeve F having a segmental flange F' and a binding nut T, by means of which the handle J is secured on the die E at any point desired. The die is also capable of adjustment in the handle securing means to adapt it for use on different kinds of saws, one position being suitable for band saws, another for gang saws and still another for circular saws, the difference in adjustment for the latter being about 80 degrees. The long bearing surface is provided on the die so that it can be moved lengthwise and a new surface presented as the die wears, and the handle by means of the bushing and lock nut can be readjusted on the die to adapt it for the different adjustments of the die with respect to the teeth to be swaged. In detail this characteristic of the tool is obtained by means of the tapering bushing F and lock nut T coöperating with the tapering hole in the hub of handle J. By loosening the nut T the handle may be turned on the bushing and adjusted at any desired point and at the same time the bushing will be loosened on the die to permit it to be moved lengthwise to present any portion of its working surface to the saw teeth.

In Fig. 7 I have shown the die E and in Figs. 7ª and 7ᵇ the variation in its surface at different points in its length. If the die were made throughout its length, of the shape shown in Fig. 7ª the operating handle would have ample power to rotate the die to the left but would be less effective in rotating it toward the right. To overcome this objection I prefer to form the die E at one end as shown in Fig. 7ᵇ and thereby give handle J equal efficiency in rotating the die in either direction. In swaging a saw the die E sometimes sticks or jams very tightly at the finish of its working stroke, thereby requiring almost as much power to return the die to its starting point, and consequently it is important to provide an operating handle bearing on the die which will render the handle as effective on the return stroke as on the forward stroke.

In Fig. 3 I have illustrated a section of the rider C having depending flanges W, W, on each side to prevent the rider from slipping off the saw B when the swage is released by the clamping screws and is being moved ahead to the next tooth to be swaged.

In a tool of this kind it is desirable to have the clamping screws to engage the saw teeth to be swaged, as near the point of the tooth as possible to prevent it from being bent sidewise when swaged. To accomplish this I provide a flat bearing surface on the clamping screw K in position to be engaged by a set screw L, thereby doing away with the usual lock nut employed for this purpose.

The operation of the device is as follows:— When the swage is in the position shown in Fig. 2. the saw blade B projects into the rider C in the lower side of block A (see Fig. 1) and the point of the tooth to be swaged is placed between anvil P and die E. The block A is held in place with respect to the back of the saw teeth by the guide N which rests upon the teeth in advance of the block. The tool is then clamped on the saw by the screws M and K and clamping handle O. The die is now in such a position that its eccentric surface will come in contact with the under side of the saw tooth while the anvil P is held against the top of the tooth. The operator taking hold of the handle J will give it about one-eighth of a turn to the left (see Fig. 4) and turn the die E so that its eccentric surface will act on the point of the saw tooth and swage the same, the back of the tooth being pressed against the lower end of anvil P. As soon as this has been done the operator will return the handle J to its normal position against the regulating stop and release the clamping screws from engagement with the saw. The swage is then moved ahead or to the left the distance between two teeth so that the next tooth ahead will pass into the space between the die E and anvil P as before. The swage is again clamped and the operation described repeated.

I am aware that prior to my invention saw-swaging devices have been made with rotary reciprocating dies in conjunction with an anvil. I do not, therefore, claim such a combination broadly. But What I do claim as my invention, and desire to secure by Letters Patent, is 1. A saw swage comprising a block A, having a recess Z and a die E mounted in said block and adjustable lengthwise therein, a bushing divided longitudinally into sections and adapted to fit on one end of said die E, said bushing having a tapered surface, an operating handle J having a socket to receive the tapered surface of said bushing, and means for securing said handle on said bushing, and whereby said handle has a rotary adjustment on said bushing to adapt the tool for use on different kinds of saws.

2. A saw swage comprising a block A having a recess Z and a die E mounted in said block, a bushing divided longitudinally into sections and adapted to fit on one end of said die E, and said bushing having a tapered outer surface at one end, an operating handle J having a correspondingly shaped socket to receive the tapered end of said bushing and said bushing having a threaded end projecting through the socket in said handle and provided with a binding nut T, whereby the said bushing, the handle and said die E may all be secured firmly together.

3. A saw swage comprising a block A having recess Z and an eccentric die E mounted in said block and a die locking device comprising a segmental clasp D mounted on said block, a bushing F mounted on said die and having a segmental flange F' to engage said clasp, said locking device being released by rotating the die E a part of a revolution beyond its normal working position.

4. A saw swage comprising a block A having a clamping screw K fitting within a threaded socket in said block, a portion of the threads of said screw intermediate to its ends being cut away forming an annular recess or groove extending around the screw, and a locking screw L mounted in said block A and adapted to engage the said screw K in said annular recess and said recess being of sufficient width to allow the adjustment of said clamping screw toward or from the tooth to be swaged.

EDWARD PICKERING ARMSTRONG.

Witnesses to signature:
M. F. CULVER,
P. P. WOODYARD.